(12) United States Patent
Jagtap et al.

(10) Patent No.: US 9,436,711 B2
(45) Date of Patent: Sep. 6, 2016

(54) METHOD AND APPARATUS FOR PRESERVING ANALYTICS WHILE PROCESSING DIGITAL CONTENT

(71) Applicant: Adobe Systems Inc., San Jose, CA (US)

(72) Inventors: Tanvi Shashikant Jagtap, Noida (IN); Yash Kumar Gupta, Agra (IN); Lalit Vohra, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 82 days.

(21) Appl. No.: 13/800,074

(22) Filed: Mar. 13, 2013

(65) Prior Publication Data

US 2014/0280380 A1  Sep. 18, 2014

(51) Int. Cl.
*G06F 17/30* (2006.01)
(52) U.S. Cl.
CPC ................. *G06F 17/30292* (2013.01)
(58) Field of Classification Search
CPC .............. G06F 17/30569; G06F 17/30595; G06F 17/30067

USPC ........................................................ 707/809
See application file for complete search history.

(56) References Cited

U.S. PATENT DOCUMENTS

| 8,543,527 | B2* | 9/2013 | Bates et al. | 706/45 |
|---|---|---|---|---|
| 2009/0024854 | A1* | 1/2009 | Fukasawa | 713/189 |
| 2009/0288011 | A1* | 11/2009 | Piran et al. | 715/720 |
| 2011/0246528 | A1* | 10/2011 | Hsieh et al. | 707/791 |
| 2012/0143888 | A1* | 6/2012 | Neelakantan et al. | 707/758 |
| 2012/0328259 | A1* | 12/2012 | Seibert et al. | 386/230 |
| 2012/0330911 | A1* | 12/2012 | Gruenheid et al. | 707/694 |
| 2013/0111326 | A1* | 5/2013 | Lockhart et al. | 715/234 |
| 2013/0219458 | A1* | 8/2013 | Ramanathan | 726/1 |

* cited by examiner

*Primary Examiner* — Scott A Waldron
*Assistant Examiner* — Dongming Wang
(74) *Attorney, Agent, or Firm* — Keller Jolley Preece

(57) ABSTRACT

A computer implemented method and apparatus for preserving analytics while processing digital content. The method comprises receiving a command for processing analytics-enabled digital content from a source file to a target file; accessing source analytics metadata from the source file; and converting the source analytics metadata to a target analytics metadata in the target file, wherein the target analytics metadata is in a format consistent with a target file format.

23 Claims, 5 Drawing Sheets

METHOD AND APPARATUS FOR PRESERVING ANALYTICS WHILE PROCESSING DIGITAL CONTENT

BACKGROUND OF THE INVENTION

1. Field of the Invention

Embodiments of the present invention generally relate to content usage analytics for digital content and, more particularly, to a method and apparatus for preserving analytics while processing digital content.

2. Description of the Related Art

Content analytics provides authors and publishers of digital content valuable usage-related information. Analytics track one or more events related to digital content usage, such as tracking the number of times an object is accessed. The object may include, without limitation, web pages (entire page and portions thereof), hyperlinks, buttons, images, form fields and the like. Analytics may also include tracking the time that is spent on a portion of the digital content, scroll movements, and the like. A listing of the events that are to be tracked are stored in metadata associated with the digital content. Information generated by tracking such events is called usage data or analytics data, which may be sent to a web analytics server for further analysis and/or reporting, thereby providing valuable information to the author or publisher which can be used for improving the digital content.

However, once analytics enabled digital content is published or otherwise distributed, it is often processed so as to become modified by a user. The user processing may convert the digital content to a new format and then distribute the converted digital content. The conversion is no longer under the control of the author. The conversion results in a loss of analytics tracking. Similarly, if a portion of the digital content is copied to a new file, the analytics tracking is lost. Hence, an author is unable to accurately track usage of such user processed digital content. Similar issues arise when the processing comprises merging or splitting analytics enabled digital content into a single or multiple files.

Currently, in order to preserve analytics during processing, the author or publisher needs to manually identify events to be tracked in the modified digital content. With the rendering of digital content by different document formats and editing by different applications, manually adding analytics functionality to multiple documents is tedious. Furthermore, because each format saves and handles the analytics related metadata differently, manually adding analytics functionality is also complex. If a large number of events/actions are to be tracked, manually adding analytics capability is cumbersome and prone to human error. Due to these limitations, authors or publishers suffer from loss of valuable information related to analytics on the usage of digital content.

Therefore, there is a need for a method and apparatus for preserving analytics while processing digital content.

SUMMARY OF THE INVENTION

A method and apparatus for preserving analytics while processing digital content substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
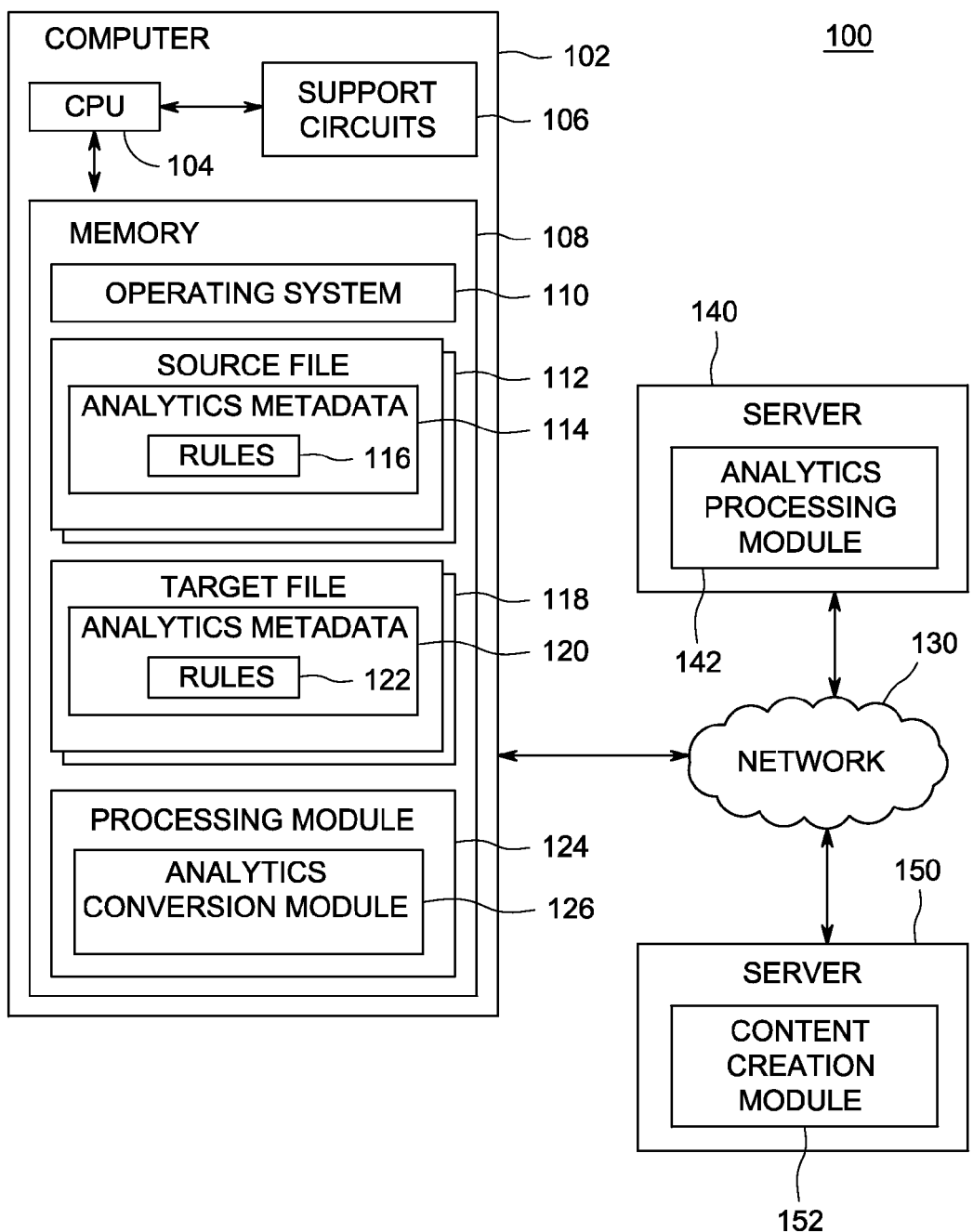
FIG. 1 is a block diagram of an apparatus for preserving analytics while processing digital content, according to one or more embodiments.

While the method and apparatus is described herein by way of example for several embodiments and illustrative drawings, those skilled in the art will recognize that the method and apparatus for preserving analytics while processing digital content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for preserving analytics while processing digital content defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. As used herein, the words "process", "processed" or "processing" are not meant to be limiting and are used to describe any modification or manipulation of digital content including, but not limited to converting digital content from a first format to a second format, merging digital content from a plurality of sources into a single target, copying, cutting or pasting digital content from a first file to a second file, and the like.

DETAILED DESCRIPTION OF EMBODIMENTS

Embodiments of the present invention comprise a method and apparatus for preserving analytics while processing digital content. When analytics-enabled digital content from a source file is processed into a target file, the processed digital content in the target file is automatically analytics-enabled. In order to preserve the analytics, analytics metadata is stored using a generic XML schema that may be read by any file format. The analytics that are enabled for the processed digital content are consistent with predefined rules associated with analytics preservation during processing of the digital content. Rules may define circumstances when analytics must be preserved as well as circumstances when analytics must be disabled. A user may perform a processing operation on a source file to convert the source file to a target file. For example, when digital content in a source format is converted to a target format, the analytics metadata of the source file is stored as analytics metadata for the target file. In several embodiments, when the processing operation is complete, the target file digital content is automatically enabled for analytics. Alternatively, the processing operation may preserve analytics metadata in the target file, however, based on the predefined rules contained in the metadata, analytics may be disabled for the target file.

When digital content is created, analytics metadata is stored with the digital content. The analytics metadata is created according to a schema that allows for converting the analytics metadata so as to preserve the analytics functionality when content is processed. For example, the analytics metadata may be composed in XML according to a schema, and included along with the digital content. When processing the digital content, the analytics metadata, for example the XML metadata, is analyzed based on one or more rules that may be included within the XML metadata. The one or more rules may relate to conversion preferences for the analytics metadata. The analytics metadata is accordingly converted, e.g., modified, preserved, or discarded according to the one or more rules. The converted analytics metadata is included with the processed digital content, making the processed digital content analytics enabled in accordance with the one or more rules.

Advantageously, the embodiments provide methods for processing digital content to different or same formats without losing the analytics metadata associated with the digital content. When digital content is processed, analytics are maintained. Further, if analytics-enabled digital content is converted to a format that does not support analytics, the analytics metadata is still stored with the digital content. In the event that the digital content is later converted to a format that does support analytics, the analytics are again enabled. The invention may be incorporated into a product, such as ADOBE® SITECATALYST® to instrument the content such that analytics is preserved when the content is processed. The invention may be incorporated into a product, such as ADOBE® ACROBAT® or ADOBE® ACROBAT® so the analytics metadata may be read and preserved. The invention may also be employed as a plug-in or a web service.

Various embodiments of a method and apparatus for preserving analytics while processing digital content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system for preserving analytics while processing digital content, according to one or more embodiments. The system 100 comprises a computer 102, a server 140, and a server 150 communicably coupled through a network 130. An example of server 140 includes an analytics server, such as ADOBE® OMNITURE® server, hereinafter referred to as analytics server 140. An example of server 150 includes a content publishing server, such as ADOBE® ACROBAT® Pro, ADOBE® BUSINESS CATALYST®, ADOBE® CONTRIBUTE®, ADOBE® DREAMWEAVER®, and the like, hereinafter referred to as publishing server 150.

The computer 102 comprises a Central Processing Unit (CPU) 104, support circuits 106, and a memory 108. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, a user-interface display, and the like. The memory 108 comprises at least one of Read Only Memory (ROM), Random Access Memory (RAM), disk drive storage, optical storage, removable storage and/or the like.

The memory 108 comprises an operating system 110, one or more source files 112, one or more target files 118, and a processing module 124. Each source file 112 contains analytics metadata 114. The analytics metadata 114 contains a plurality of rules 116. Each target file 118 contains analytics metadata 120. The analytics metadata 120 contains a plurality of rules 122. The processing module 124 may be any digital content processing application, such as ADOBE® ACROBAT®, ADOBE® ACROBAT® Pro, and the like, capable of processing digital content. The processing module 124 includes an analytics conversion module 126 capable of converting analytics metadata associated with source file 112. The operating system 110 may comprise various commercially known operating systems.

The analytics server 140 is a computing device, for example, similar to the computer 102, and comprises an analytics processing module 142. In an embodiment, the analytics server 140 is an ADOBE® OMNITURE® server, ADOBE® Marketing Cloud, and the like. The analytics processing module 142 is capable of receiving, storing, analyzing and reporting usage data related to digital content.

The publishing server 150 is a computing device, for example, similar to the computer 102, and comprises a content creation module 152. In an embodiment, the content creation module 152 may be a content creation application, such as ADOBE® ACROBAT®, ADOBE® ACROBAT® Pro, and the like, capable of creating and/or publishing content. The content creation module 152 is also capable of creating analytics metadata, which is associated with the digital content. The analytics metadata may include one or more rules for converting source analytics metadata to target analytics metadata. In some embodiments, the publishing server 150 and the computer 102 may be the same device.

The analytics metadata 114, 120 include analytics destination identification, which identifies a destination to which usage data is directed for further analysis. According to one embodiment, the usage data is sent to a destination on the analytics server 140. Usage data from different instances (e.g., different file formats, copied, merged, or split instances) of a digital content is associated with a single analytics destination identification, and therefore allows for collecting usage data related to a particular digital content to be gathered in a central location.

The analytics metadata 114, 120 include information on events in the source file 112 and target file 118 that are to be tracked, objects corresponding to such events, and a list of content formats for which each event is valid. For example, some events may be relevant only in the case of HTML content, and such events must be tracked when content is consumed in HTML format only. In that case, such events should not be tracked when the content is consumed in formats other than HTML.

Rules 116, 122 include conditions on how to treat or convert analytics metadata, based on the processing operation. For example, rules 116, 122 include conditions in which processing the source file 116 must preserve the analytics metadata. The conditions include, without limitation, combining multiple content files into a single file, splitting a file into multiple files, conversion of a file in a source format to any one of a list of target formats. Rules 116 may also include conditions in which processing of the source file 112 must discard at least a part of the analytics metadata 114 and/or disable the analytics capability for the associated digital content. The processing conditions include, without limitation, editing of a source file, adding a page or content to the source file, deleting a page or content from the source file, redacting the source file, among others.

The analytics metadata 114, 120 therefore includes information for enabling usage statistic collection in different formats, for different event types, and different types of content processing scenarios. In some embodiments, the analytics metadata 114, 120 may be stored within a file, for example, in a metadata section of the file, or in a section that allows for storing metadata without modifying the content specifications. In other embodiments, the analytics metadata 114, 120 may be stored separate from the source file 112 or target file 118.

When digital content contained in a source file 112 is copied, converted, or otherwise processed, the analytics conversion module 126, based on rules 116, 122, converts or copies the analytics metadata 114 with the digital content and stores the converted metadata in the target file 118 as analytics metadata 120.

Figure 2:
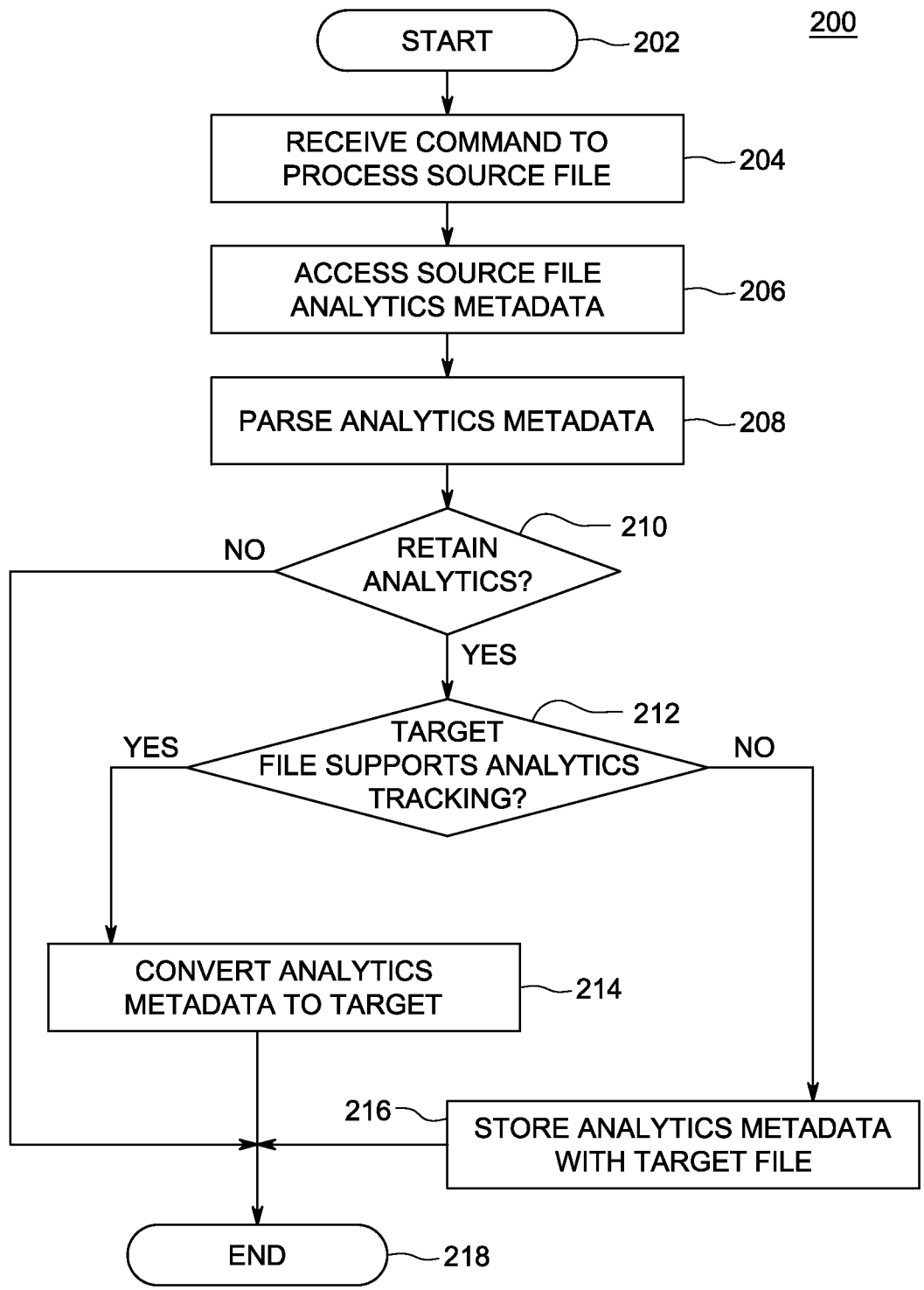
FIG. 2 depicts a flow diagram of a method for preserving analytics metadata while processing digital content, as performed by the analytics conversion module of FIG. 1, according to one or more embodiments.

FIG. 2 depicts a flow diagram of a method 200 for preserving analytics metadata while processing digital content, as performed by the analytics conversion module 126 of FIG. 1, according to one or more embodiments. The method 200 receives a command to process digital content from a source file to a target file. A user may perform the processing operation to consume digital content in a desired format and a desired configuration. When the processing operation is complete, the method 200 automatically preserves the analytics metadata in the target file in accordance with rules embedded in the analytics metadata of the source file.

The method 200 starts at step 202 and proceeds to step 204. At step 204, the method 200 receives a command to process one or more source files to one or more target files. The command may be to convert the digital content from a first format in the source file, for example a Hyper Text Markup Language (HTML) e-book to a Portable Document Format (PDF) format in a target file. Alternatively, the command may be to combine the digital content from two files, for example, two source PDF files into a single target file. The digital content from a single source file may be split into two target files. The command to process one or more source files to one or more target files includes information on the source file format and the target file format.

The method 200 proceeds to step 206, where the method 200 accesses the source file(s) including the analytics metadata. Analytics metadata is stored in the source file according to a generic XML schema that may be read by any file format. For example, if the source file is an HTML web page with a hyperlink to a Universal Resource Locator (URL) entitled "Click Here", an author may wish to measure the number of times the "Click Here" hyperlink is clicked. Analytics metadata code may be as follows:

```
<Adobe_Analytics>
    <ReportSuiteID>TESTReportSuite</ReportSuiteID>
    <EventsToLog>
        <Links>
            <Link>
                < LinkUrl >    someUrl    </ LinkUrl >
                <LinkName>    Click Here </LinkName>
                    <Variable> propTEST </Variable>
            </Link>
        </Links>
    </EventsToLog>
</Adobe_Analytics>
```

In the case of HTML, this XML code may be stored either in a metadata section or in the div tag of HTML. In some embodiments, the metadata is embedded inside the HTML in the form of custom attributes inside tags. In a PDF, this XML code may be stored in the pieceInfo section of the PDF document, which allows plug-in specific private data to be stored without modifying the PDF specification. In some embodiments, where the target file supports JavaScript, the analytics may be preserved in JavaScript. This code causes data to be sent to an analytics server each time the URL link is clicked. Although the present example describes tracking the clicks to a hyperlink, any element may be tracked, including but not limited to, an image, a link, a button, and a form field. In fact, user interactions with the complete document may also be tracked, e.g., accessing a particular page, amount of time spent on a particular page, and the like.

The method 200 proceeds to step 208, where the method 200 parses the source analytics metadata to analyze the rules for converting the source file(s) analytics metadata for the target file(s). Rules may be defined by the author of the content. Rules define when analytics are to be enabled during processing and when analytics should be disabled. These rules may be based on a target file format or on the processing that is performed. Rules are optional in the analytics metadata.

The method 200 proceeds to step 210, where the method 200 determines if the analytics metadata needs to be preserved for the target file. The method 200 uses the rules obtained from analytics metadata and the target file format or configuration, to determine whether the rules allow for retaining the analytics metadata for the target file. Rules may be based on the type of content, for example, rules may be applied to individual elements, such as paragraphs, images, hyperlinks, buttons, and the like. For example, in situations where the digital content in the source file is being edited, additional content is added, content is deleted or otherwise modified by a user other than an author, the author may have included a rule for the analytics to discard the analytics metadata for the modified content because the usage data retrieved about the modified content can no longer be trusted to be relevant to the author's original digital content. In addition, different types of tracking, such as clicks, number of times content is rendered, number of times a mouse hovered but was not clicked, etc., may be selected for future tracking, while other types of tracking are not. If the method 200 determines that the analytics data must not be retained, the method 200 proceeds to step 218 and ends.

If at step 210 the method 200 determines that there are no rules to discard the analytics, the method 200 proceeds to step 212. At step 212, the method 200 determines whether the target file format supports analytics tracking. For example, some electronic book (e-book) formats such as the Electronic Publication (EPUB) format does not support analytics tracking.

If at the step 212, the method 200 determines that the target file is in a format that supports analytics tracking, the method 200 proceeds to step 214, where the method 200 converts the source file analytics metadata to the target file analytics metadata in a manner consistent and operational with the target file format as described in further detail with respect to FIG. 3 below. The method 200 proceeds to step 218 and ends.

However, if at the step 212, the method 200 determines that the target file does not support analytics tracking, the method 200 proceeds to step 216. At step 216, the method 200 copies the source file analytics metadata and stores it with the target file as described in further detail with respect to FIG. 4 below. Although the target file format does not support analytics, the analytics metadata is stored with the target file. If at some time in the future, part or all of the target file is converted into a file format that supports analytics tracking, the stored analytics metadata from the source file is enabled in the final file format. The method 200 proceeds to the step 218 and ends.

Figure 3:
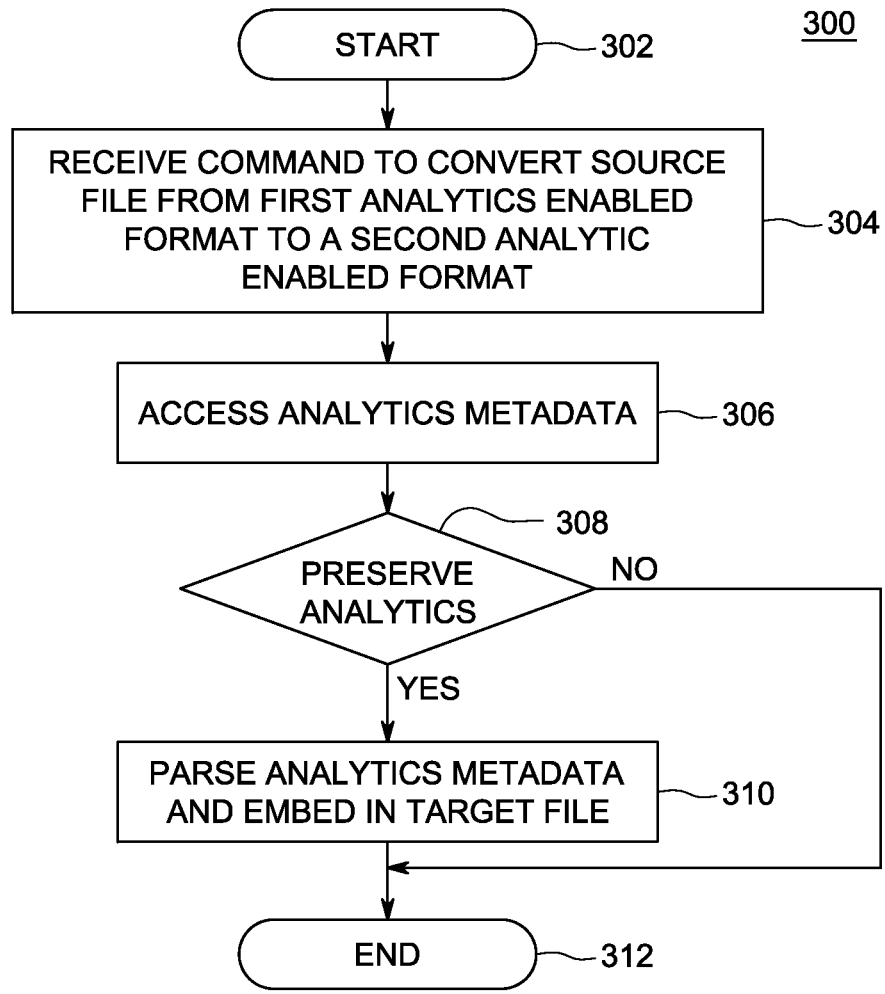
FIG. 3 depicts a flow diagram of a method for preserving analytics metadata while processing digital content when both the source file and target file support analytics tracking, as performed by the analytics conversion module of FIG. 1, according to one or more embodiments.

FIG. 3 depicts a flow diagram of a method 300 for preserving analytics metadata while processing digital content when both the source file and target file support analytics tracking, as performed by the analytics conversion module 126 of FIG. 1, according to one or more embodiments. The method 300 receives a command to process digital content from a source file in a format that is analytics enabled, and save it to target file in a format that is analytics enabled. The method 300 automatically preserves the analytics metadata in the target file.

The method 300 starts at step 302 and proceeds to step 304. At step 304, the method 300 receives a command to convert a source file in a first format to a target file in a second format, for example from HTML to PDF. The method 300 proceeds to step 306, where the method 300 accesses the analytics metadata to analyze the rules for converting the analytics metadata for the target file. The analytics metadata is XML code embedded in the source file.

The method 300 proceeds to step 308, where the method 300 determines, based on the rules contained in the metadata, whether to preserve the analytics metadata. For example, a rule may require preserving the analytics metadata when converting to a PDF. Another rule may require discarding analytics metadata when converting to format ABC.

If the method 300 determines the rules required discarding analytics metadata for the target format, the method 300 proceeds to step 312 and ends. However, if the method 300 determines the rules require preserving analytics for the target format, the method 300 proceeds to step 310.

At step 310, the method 300 parses the analytics metadata. The method 300 reads every xml tag present in the embedded XML and stores that information in the target format. For example, if the target file is a PDF file, the XML code is embedded in the form of a pieceInfo dictionary in a pre-defined format in the target file. The target file is analytics enabled. The events that were tracked by a usage log in the source file are now tracked by a usage log in the target file. The method 300 proceeds to step 312 and ends.

Figure 4:
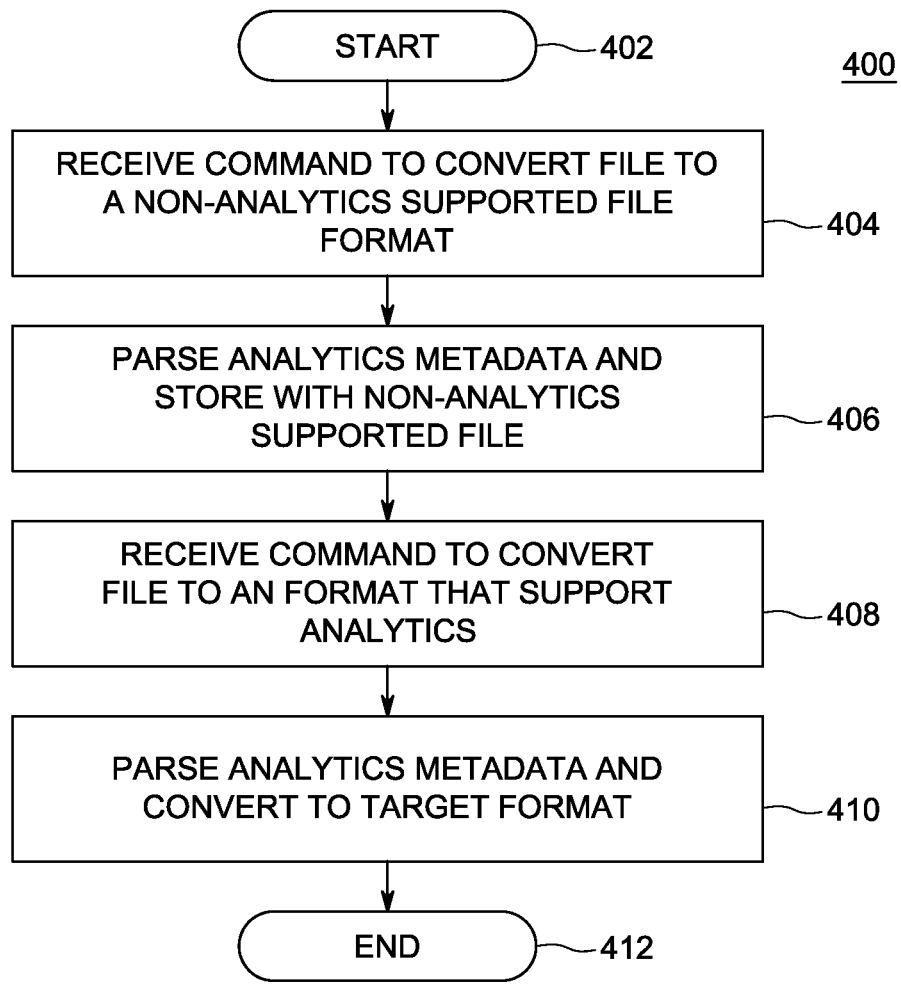
FIG. 4 depicts a flow diagram of a method for preserving analytics metadata while processing digital content when the digital content is converted to an intermediate format that does not support analytics and is then converted to a format that does support analytics tracking, as performed by analytics conversion module of FIG. 1, according to one or more embodiments.
Figure 5:
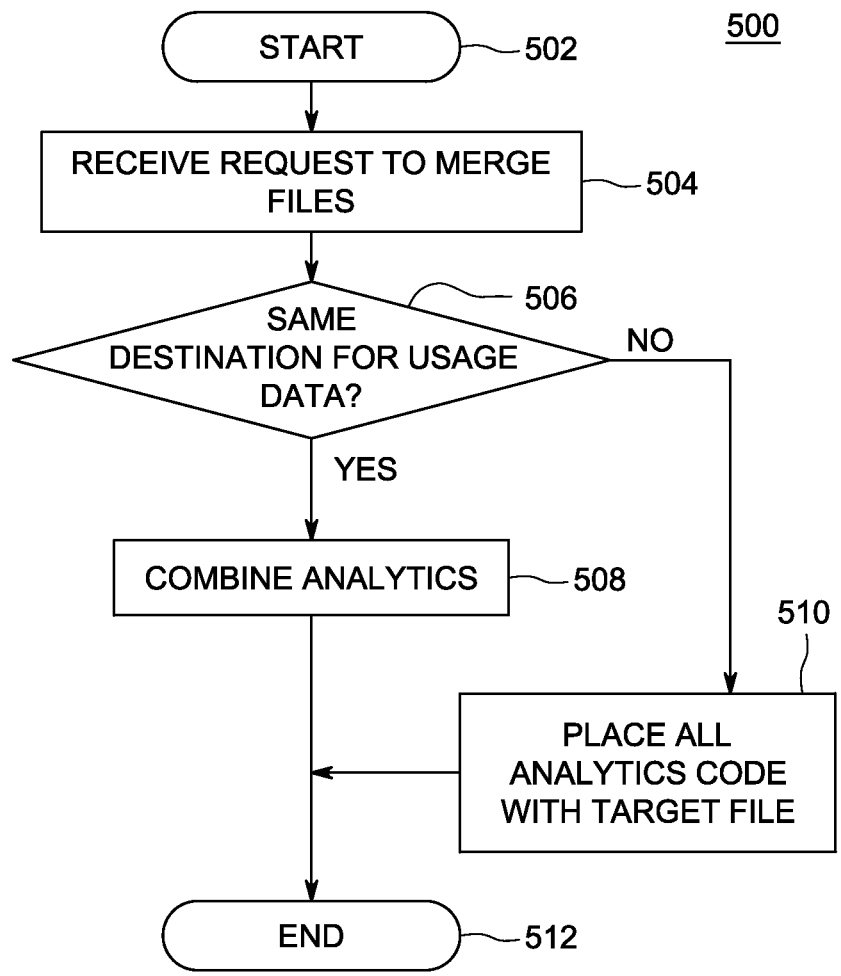
FIG. 5 depicts a flow diagram of a method for combining analytics metadata when merging two or more source files to a target file, as performed by the analytics conversion module of FIG. 1, according to one or more embodiments.

FIG. 4 depicts a flow diagram of a method 400 for preserving analytics metadata while processing digital content when the digital content is converted to an intermediate format that does not support analytics and is then converted to a format that does support analytics tracking, as performed by the analytics conversion module 126 of FIG. 1, according to one or more embodiments. The method 400 preserves the analytics metadata in the intermediate format, where the analytics are not supported. The method 400 then enables the analytics when the digital content is converted from the intermediate format into a format that supports analytics tracking.

The method 400 starts at step 402 and proceeds to step 404. The method 400 receives a command to convert a source file in an analytics enabled format to a second format that does not support analytics, for example from HTML to fictitious format XYZ. The method 400 proceeds to step 406, where the method 400 parses the analytics metadata. In the example, the method 400 searches the HTML for the analytics XML code. The method 400 then parses the XML code in the source format (i.e., HTML) and copies the XML code into a metadata section of the XYZ file. The XML code is identical to the generic XML code from above:

```
<Adobe_Analytics>
    <ReportSuiteID>TESTReportSuite</ ReportSuiteID>
    <EventsToLog>
        <Links>
            <Link>
                < LinkUrl >      someUrl       </ LinkUrl >
                <LinkName>     Click Here </LinkName>
                    <Variable> propTEST </Variable>
            </Link>
        </Links>
    </EventsToLog>
</Adobe_Analytics>
```

In some embodiments, rules for preserving analytics are also stored in the metadata section of the XYZ file. The XYZ file has the analytics metadata, however, because XYZ does not support analytics, the XYZ file in not analytics enabled, and no usage statistics are logged into the analytics server from this XYZ file.

The method 400 proceeds to step 408, where the method 400 receives a command to convert the XYZ file into an analytics enabled format, for example, PDF. The method 400 proceeds to step 410, where the method 400 reads the XML metadata and converts the XML metadata to the target format in a pre-defined format. In this example, the XYZ file is converted to PDF. The XML metadata is converted to the PDF pieceInfo dictionary. The XML tag name is converted to a "key" in the pieceInfo dictionary and the content is converted to a "value". This is repeated for all XML tags in the metadata. The resultant PDF metadata of the target file may be as follows:

```
/PieceInfo<<
    /Adobe_Analytics <<
            /ReportSuiteID  [(TESTReport Suite)]
        /Links
        <<      /Link1 <<
                /LinkUrl           (someURL)
                /LinkName          (Click Here)
                /Variable          (propTEST) >>
                >>
    >>
>>
```

The created target PDF is now analytics-enabled and the usage statistics of the PDF file are logged into the analytics server. The method 400 proceeds to step 412 and ends.

FIG. 500 depicts a flow diagram of a method 500 for combining analytics metadata when merging two or more source files to a target file, as performed by the analytics conversion module 126 of FIG. 1, according to one or more embodiments.

The method 500 starts at step 502 and proceeds to step 504. At step 504, the method 500 accesses a plurality of analytics-enabled source files, including corresponding source file analytics metadata, for merging into a single target file. In the present example, three source files are PDF files that are combined into a single PDF file.

The method 500 proceeds to step 506, where, the method 500 determines whether all source files are sending usage data to the same destination analytics server. In some embodiments, if the source files send their usage data to different destination analytics servers, the analytics metadata cannot be merged. In some embodiments, if the source files send their usage data to different destination analytics servers, a user may be provided with options, such as an option to select a destination analytics server, stop the combine command, and the like. In addition, rules for preserving analytics may be different for the source files, in which case the analytics metadata cannot be merged. If the method 500 determines that the analytics metadata cannot be merged, the method 500 proceeds to step 510, where the method 500 stores the analytics metadata of each source file in the target file. The source analytics metadata from each source file that is not combinable is appended to the target analytics metadata sequentially. However, if the method 500 determines that the analytics metadata can be combined, the method 500 combines source analytics metadata and embeds the combined XML code in the target analytics metadata.

For example, three different source files in PDF format, File1, File2, and File3 are required to be merged, for example using the command 'Combine PDF' into a single PDF file, ResultFile. The source files include corresponding source analytics metadata. For example, for PDF files, pieceinfo dictionaries corresponding to File1, File2, File3 are as follows:

File1 Analytics Metadata

```
/PieceInfo    <<
    /Adobe_Analytics <<
            /ReportSuiteID       [ (TESTReportSuite) ]
        /Links
            <<      /Link1 <<
                    /LinkUrl            (someUrl1)
                    /LinkName           (Home Page)
                    /Variable           (propTEST) >>
                    >>
            /DisableAnalytics    [(PageDelete)]
    >>
>>
```

File2 Analytics Metadata

```
/PieceInfo    <<
    /Adobe_Analytics <<
            /ReportSuiteID       [ (TESTReportSuite) ]
        /Links
            <<      /Link1 <<
                    /LinkUrl            (someUrl2)
                    /LinkName           (Contact Page)
                    /Variable           (propTEST2) >>
                    >>
    >>
>>
```

File 3 Analytics Metadata

```
/PieceInfo    <<
    /Adobe_Analytics <<
            /ReportSuiteID       [ (TESTReportSuite) ]
        /Links
            <<      /Link1 <<
                    /LinkUrl            (someUrl3)
                    /LinkName           (Help Page)
                    /Variable           (propTEST3) >>
                    >>
            /DisableAnalytics    [(CombinePdf)]
    >>
>>
```

The File1 analytics metadata requires that the analytics metadata must not be retained when a page is deleted. The File3 analytics metadata requires that the analytics metadata must not be retained in case of Combine PDF, and therefore, the method 500 discards the analytics metadata associated with the File3. However, the File1 and File2 analytics metadata has no such requirement in the case of a Combine PDF, and therefore the File1 and File2 analytics metadata can be retained. Accordingly, the analytics metadata for File1 and File2 can be merged, and the method 500 combines the analytics metadata for File1 and File2. When converting source metadata to target metadata according to the method 500, File3 analytics metadata is discarded. The method 500 therefore merges the analytics metadata of File1 and File2 in the analytics metadata of the ResultFile, as follows:

ResultFile Analytics Metadata

```
/PieceInfo <<
    /Adobe_Analytics1 <<
            /ReportSuiteID       [ (TESTReportSuite) ]
        /Links
            <<      /Link1 <<
```

| ResultFile Analytics Metadata |
| --- |
| /LinkUrl SomeUrl1<br>/LinkName (Home Page)<br>/Variable (propTEST) >><br>>><br>/DisableAnalytics [(PageAdd) (PageDelete)]<br>\Adobe__Analytics2 <<<br>/ReportSuiteID [ (TESTReportSuite) ]<br>/Links<br><< /Link2 <<<br>/LinkUrl SomeUrl2<br>/LinkName (Contact Page)<br>/Variable (propTEST2) >><br>>><br>>><br>>> |

In all the methods described above, the digital content is processed, for example by the processing module 124. According to some embodiments, the methods described above provide the appropriate analytics metadata for inclusion in the processed digital content.

In some embodiments, a user interface is provided to an author for adding metadata and its rules. Through the user interface, an author may add target formats in which analytics are not to be preserved, e.g., PDF, XYZ; add operations for which analytics should not be preserved, e.g., page-add or page-delete; and/or add page elements for which analytics should not be preserved, e.g., a particular image. In some embodiments, the user interface allows the author to create rules that define, for example, whether the target format supports analytics, whether the rule states that the target format must have analytics enabled, whether a particular event is applicable to the target format (e.g., when converting from PDF to HTML, the "add comment" even has no relevance).

Embodiments are described herein with respect to HTML as a source file format in which the analytics are enabled, e-book (or EPUB) format as a format in which the analytics are disabled, and PDF formats as target file formats in which the analytics are enabled, however, the embodiments are not restricted to such formats, but extend to digital content in any format. Use of HTML, e-book and PDF formats is merely for the purpose of illustrating one or more examples and are not intended to restrict the embodiments in any manner.

In one embodiment, content created in HTML5 includes conversion enabled analytics metadata. HTML5 allows custom attributes inside HTML5 tags, and therefore, custom attributes including conversion enabled analytics details are included throughout the HTML5 code as tags. When processing digital content created using HTML5, in a manner similar to that described with respect to FIG. 2, the analytics conversion module 126 identifies the tags containing analytics metadata, and upon such identification, converts the tags with analytics metadata to target analytics metadata, which is included in the target file (processed digital content).

Further, embodiments generally comprise including format independent or conversion enabled analytics metadata in digital content, and while processing digital content, converting the analytics metadata to preserve functionality in the processed digital content. The converted analytics metadata may be dormant in the processed digital content in some embodiments, for example, where the target format is not analytics enabled; and may be active in some embodiments so that the processed digital content is analytics enabled.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method performed by a client computing device associated with a user for preserving analytics capabilities while processing digital content, the method comprising:
   receiving, by the client computing device, a command to include analytics-enabled digital content from a source file in a target file, the source file having analytic capabilities that support tracking usage statistics of the source file;
   accessing, by the client computing device, metadata of the source file comprising information that enables collection of tracked usage statistics of the source file, the metadata of the source file comprising a destination for sending the tracked usage statistics of the source file and the target file;
   converting, by the client computing device, the metadata from the source file to metadata for the target file while preserving at least one of the analytic capabilities associated with the metadata of the source file, wherein the metadata of the target file is in a format consistent with a target file format for the target file; and
   embedding the metadata of the target file within the target file at a location within the target file specified by the metadata of the source file.

2. The method of claim 1, wherein the metadata of the source file comprises rules, and wherein the rules comprise conditions defining enablement of one or more of the analytic capabilities for the target file based on the target file format of the target file.

3. The method of claim 2, wherein the conditions are based on one or more analytic capabilities of the target file format or the command to include analytics-enabled digital content from the source file in the target file.

4. The method of claim 1, wherein the metadata of the source file comprises XML code embedded in the source file, and wherein the target file format is a pdf format.

5. The method of claim 4, wherein embedding the metadata for the target file within the target file at the location within the target file specified by the metadata of the source file comprises embedding the XML code in a PieceInfo dictionary in the target file, wherein embedding the XML code in the PieceInfo dictionary in the target file enables one or more of the analytic capabilities for the target file.

6. The method of claim 1, wherein the command further comprises at least one of a command to convert the digital content in the source file from a first format to a second format, a command to merge two or more source files into a single target file, a command to split the source file into two or more target files, or a command to edit digital content in the source file.

7. The method of claim 6, wherein the target file format does not support analytics, and wherein converting the metadata from the source file to metadata for the target file comprises copying the metadata from the source file to metadata for the target file in a manner so that the metadata of the target file is analytics-disabled for the target file.

8. The method of claim 7, further comprising converting the metadata of the target file to metadata for a second target file that supports analytics by converting the metadata of the target file to metadata for the second target file in a manner so as to enable one or more of the analytic capabilities for the second target file.

9. The method of claim 1, wherein the command comprises a command to merge two or more source files into a single target file, and wherein merging two or more source files into the single target file comprises combining metadata that enables analytic capabilities of the two or more source files of the two or more source files and storing the combined analytics metadata with the target file.

10. The method of claim 1, further comprising:
    using the metadata of the source file to enable one or more of the analytic capabilities for the source file; and
    using the embedded metadata of the target file to enable the same one or more of the analytic capabilities for the target file.

11. The method of claim 1, wherein the metadata of the source file further comprises an identification of the analytic capabilities of the source file.

12. The method of claim 1, wherein embedding the metadata of the target file within the target file is performed regardless of enablement of one or more of the analytic capabilities for the target file.

13. The method of claim 1, wherein if the target file supports one or more of the analytic capabilities that support tracking usage statistics of the source file, then the location specified by the metadata comprises a location of the target file that enables the one or more of the analytic capabilities for the target file.

14. An apparatus for preserving analytics capabilities while processing digital content, comprising:
    at least one processor; and
    at least one non-transitory computer-readable medium storing instructions thereon that, when executed by the at least one processor, cause the apparatus to:
    receive, from a user, a command to include analytics-enabled digital content from a source file in a target file, the source file having analytic capabilities that support tracking usage statistics of the source file;
    access metadata of the source file comprising information that enables collection of tracked usage statistics of the source file, the metadata of the source file comprising a destination for sending the tracked usage statistics of the source file and the target file;
    convert the metadata from the source file to metadata for the target file while preserving at least one of the analytic capabilities associated with the metadata of the source file, wherein the metadata of the target file is in a format consistent with a target file format for the target file; and embed the metadata of the target file within the target file at a location within the target file specified by the metadata of the source file.

15. The apparatus of claim 14, wherein the metadata of the source file comprises XML code embedded in the source file, wherein the XML code comprises rules, and wherein the rules comprise conditions for defining the metadata of the target file to enable one or more of the analytic capabilities for the target file.

16. The apparatus of claim 14, wherein the command further comprises at least one of a command to convert the source file from a first format to a second format, a command to merge two or more source files into a single target file, a command to split the source file into two or more target files, or a command to edit digital content in the source file.

17. The apparatus of claim 14, wherein the target file format does not support analytics, wherein converting the metadata from the source file to metadata for the target file comprises copying the metadata of the source file to metadata of the target file in a manner so that the metadata for the target file is analytics-disabled for the target file, and wherein the instructions, when executed by the at least one processor, further cause the apparatus to convert the metadata of the target file to metadata for a second target file that supports analytics in a manner so as to enable one or more of the analytic capabilities for the second target file.

18. A non-transitory computer readable medium storing instructions that, when executed by at least one processor, causes a computing system to:

receive, from a user, a command to include analytics-enabled digital content from a source file in a target file, the source file having analytic capabilities that support tracking usage statistics of the source file;

access metadata of the source file, the metadata of the source file comprising information that enables collection of tracked usage statistics of the source file, the metadata of the source file comprising a destination for sending the tracked usage statistics of the source file or target file;

convert the metadata from the source file to metadata for the target file while preserving at least one of the analytic capabilities associated with the metadata of the source file, wherein the metadata of the target file comprising information that enables collection of one or more of the tracked usage statistics of the target file and is in a format consistent with a target file format for the target file, the metadata of the target file further comprising the destination for sending the one or more of the tracked usage statistics of the target file; and embed the metadata of the target file within the target file at a location within the target file specified by the metadata of the source file.

19. The non-transitory computer readable medium of claim 18, wherein the metadata of the source file comprises rules, wherein the rules comprise conditions defining enablement of one or more of the analytic capabilities for the target file.

20. The non-transitory computer readable medium of claim 19, wherein the conditions are based on one or more analytics capabilities of the target file format or the command to include the analytics-enabled digital content from the source file in the target file.

21. The non-transitory computer readable medium of claim 18, wherein the metadata of the source file comprises XML code embedded in the digital content of the source file.

22. The non-transitory computer readable medium of claim 18, wherein the target file format does not support analytics, and wherein converting the metadata from the source file to metadata for the target file comprises copying the metadata of the source file to metadata of the target file in a manner so that the metadata of the target file is analytics-disabled for the target file.

23. The non-transitory computer readable medium of claim 22, the method further comprising converting the metadata of the target file to metadata for a second target file that supports analytics by converting the metadata of the target file to metadata for the second target file in a manner so as to enable one or more of the analytic capabilities for the second target file.

* * * * *